United States Patent [19]

Hildebrandt et al.

[11] 4,296,366
[45] Oct. 20, 1981

[54] MOTOR STARTING SWITCH

[75] Inventors: Eugene F. Hildebrandt; Thomas V. Ottersbach, both of St. Louis County, Mo.

[73] Assignee: Emerson Electric Co., St. Louis, Mo.

[21] Appl. No.: 82,769

[22] Filed: Oct. 9, 1979

[51] Int. Cl.³ .............................................. H02P 5/30
[52] U.S. Cl. .................................. 318/793; 318/325; 200/80 R
[58] Field of Search ............... 318/793, 325; 200/332, 200/335, 80 R, 6 BA, 6 BB, 153 H, 1 A

[56] References Cited

U.S. PATENT DOCUMENTS

| | | | |
|---|---|---|---|
| 3,209,093 | 9/1965 | Simpson | 200/80 R |
| 3,493,707 | 2/1970 | Castle | 200/335 |
| 3,691,415 | 9/1972 | Hancock et al. | 200/80 R |
| 3,790,730 | 2/1974 | Wyland | 200/80 R |

*Primary Examiner*—David Smith, Jr.
*Attorney, Agent, or Firm*—Polster, Polster and Lucchesi

[57] ABSTRACT

A motor starting switch installable, for example, on a fractional horsepower electric motor and actuable between a run and a start position by means of a centrifugal actuator axially shiftable on the rotor shaft of the motor in response to start up or shut down of the motor. The starting switch includes a rotary actuator member having a cam follower engageable by a conical cam surface on the centrifugal actuator as the latter shifts axially from its run to its start position thereby to effect rotary movement of the actuator member and to effect actuation of the switch from its run to its start position as the centrifugal actuator moves through only a portion of its stroke. The rotary actuator member is further engageable with a cylindrical cam surface of the centrifugal actuator after the switch has been converted to its start position thereby to prevent overstressing of a switch arm within the starting switch upon continued movement of the centrifugal actuator to its start position.

4 Claims, 7 Drawing Figures

START POSITION

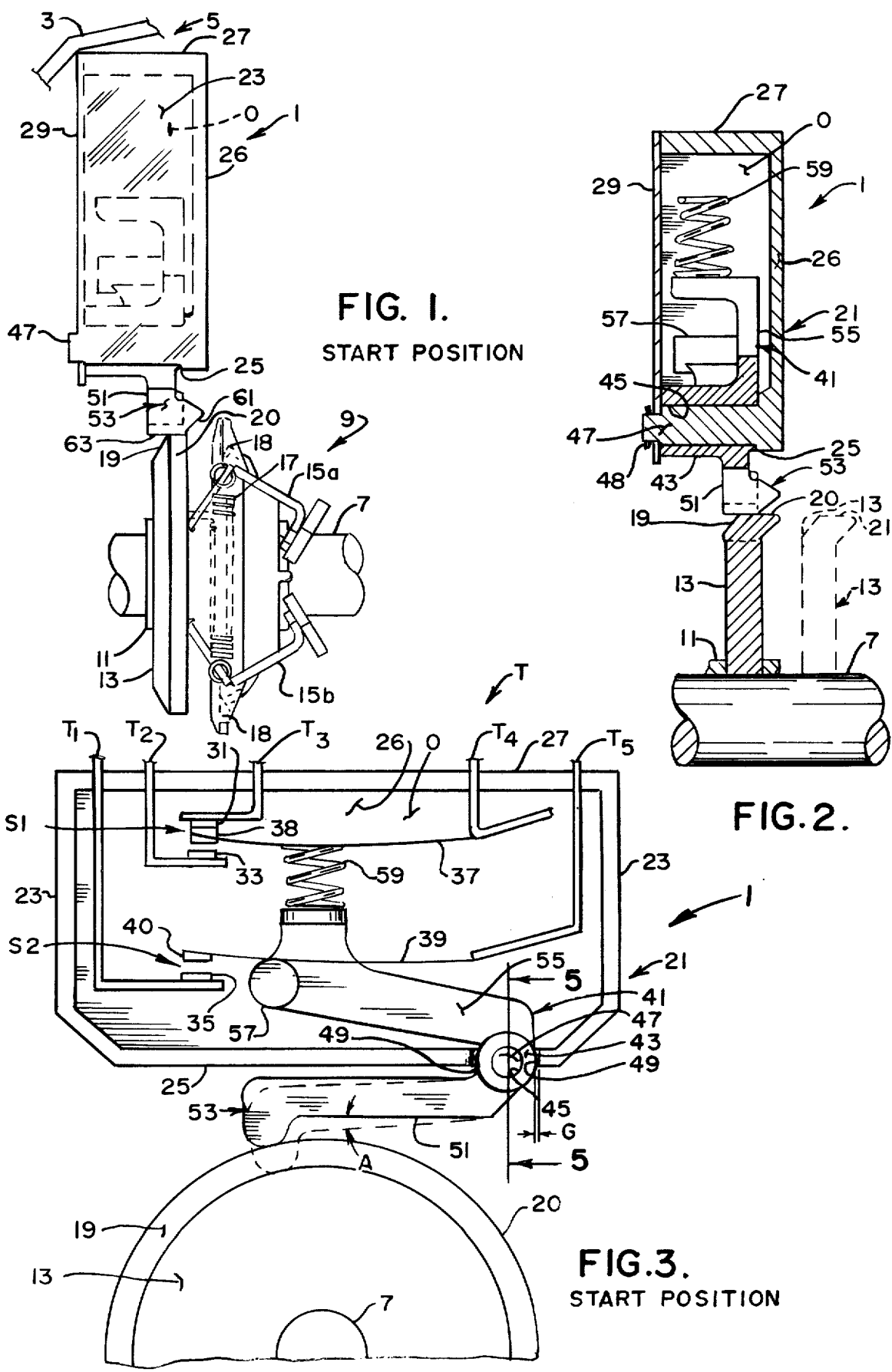

MOTOR STARTING SWITCH

BACKGROUND OF THE INVENTION

This invention relates to a switch for a dynamoelectric machine, and more particularly to a starting switch for a fractional horsepower induction electric motor.

Typically, capacitor start and split phase induction motors have a run winding and a starting winding placed in winding receiving slots provided in the bore of the stator core of the motor. The starting winding is energized during start up of the motor (or when the speed of the motor falls below a specified operating speed) so as to create a rotating field in the stator and to apply sufficient torque to the rotor for starting purposes. However, once the motor has accelerated to a desired operating speed, (e.g., this speed may be about 80 percent or more of the normal operating speed of the motor), the rotor is able to follow the alternations of the magnetic field created by the run windings, and the starting winding no longer is needed. Typically, the starting winding is not intended for continuous use and may fail if not deenergized during normal operation of the motor. As is conventional, a switch, referred to as a motor starting switch, is provided in the motor for energizing the starting winding only during start up of the motor and for deenergizing the starting winding once the motor has attained its desired operating speed. These motor starting switches are conventionally actuated by a centrifugal actuator mounted on and rotatable with the rotor shaft of the motor, the centrifugal actuator being responsive to the speed of the motor for actuating the starting switch from its start to its run position in response to the motor attaining a predetermined operating speeed. Centrifugal actuators typically include an actuator member movable axially on the rotor shaft from an off or stop position when the motor is stopped (or is operating below a specified operating speed) to a run position upon the motor accelerating to a predetermined operating speed. Typically, an actuator linkage operatively interconnects the motor starting switch and the actuator member of the centrifugal actuator. As shown in the co-assigned U.S. Pat. No. 4,034,173, this linkage may include a lever interconnecting the switch and actuator member, a spring, and means for adjusting the lever with respect to the actuator. In some instances, the lever is pivoted on a portion of the motor itself, for example on the end shield of the motor. These parts must of necessity be installed before the motor starting switch has been installed in the motor during manufacture thereof.

Because the actuator member of the centrifugal actuator moves only a limited distance between its off and run positions, it has heretofore been necessary to accurately adjust the relative positions of the motor starting switch and the centrifugal actuator so as to ensure that the former is properly actuated by the centrifugal actuator at a specified motor operating speed. This adjustment of the centrifugal actuator with respect to the motor starting switch is a time consuming operation and thus results at least in part in higher labor costs in manufacture of the motor. Typically, a centrifugal actuator only exerts a relatively light force on the linkage interconnecting the actuator member and the motor starting switch. With prior linkage arrangements, the force exerted on the linkage was, in some instances, too low to actuate the motor starting switch so as to energize the starting winding of the motor upon subsequent start up of the motor. This condition is sometimes referred to as a "stuck" actuator condition and it prevents the motor from starting.

During the service life of a motor, end play (i.e., axial movement) of the rotor shaft with respect to the end shields (or the frame) of the motor may develop. This end play may be sufficient so as to appreciably change the relative position of the centrifugal actuator mounted on the rotor shaft and the motor starting switch rigidly mounted on the frame or end shield of the motor thus effecting operation of the motor starting switch. Under certain end play conditions, the centrifugal actuator could fail to deenergize the starting winding upon the motor attaining its desired operating speed thus causing the starting winding to fail. Under other end play conditions, the centrifugal actuator may fail to reset the motor starting switch to energize the starting winding upon subsequent start up of the motor and thus the motor would fail to start.

Also, in certain motor applications (e.g., in a clothes dryer) in which the motor starting switch is exposed to lint-laden air, the deposit of the lint within the switch has heretofor been a problem. More specifically, the motor starting switch is typically installed in a location within the motor proximate the motor bearing lubrication system and oil vapor is oftentimes deposited on all of the exterior surfaces of the switch including the actuating plunger. Typically, the actuator plunger of prior art motor starting switches was moveable in axial direction in and out of the starting housing upon actuation of the switch, and lint on the plunger was carried into the inside of the switch housing. Also, prior art motor starting switches have oftentimes had a large gap between the plunger and the housing through which lint could readily enter the housing. Upon entering the housing, this lint would collect on various electrical components within the switch, and could, on occasion, prevent good contact between the electrical contacts within the switch thus causing intermittent or improper operation of the switch, and could, in certain instances, result in failure of the motor to start.

Also, many prior art motor starting switches had a problem of overstressing (and thus permanently deforming) one or more of the switch arms within the starting switch upon the moveable switch arm engaging a fixed contact prior to completion of the stroke of the centrifugal actuator. Typically, the force of the centrifugal actuator was such, that once the switch arm became stoppd against a fixed electrical contact, then the centrifugal actuator could continue to apply increased force to the switch arm which could drastically increase the bending moment on the switch arm. In certain applications it has been found that this overstressing was sufficient to cause permanent deformation of the switch arm and thus the switch arm lost its resilient characteristics which biased it toward contact with an opposed fixed contact when the motor was running.

Among the several objects and features of the present invention may be noted the provision of a motor starting switch operable by a centrifugal actuator which requires a relatively low force to actuate it;

The provision of such a motor starting switch which is relatively insensitive to end play of the rotor shaft and which need not be accurately positioned with respect to the centrifugal actuator during manufacture of the motor;

The provision of such a motor starting switch in which the force applied to the contacts of the starting switch by the centrifugal actuator is limited so as to prevent damage to the flexible switch arms carrying the moveable contacts;

The provision of such a starting switch which substantially reduces the entrance of lint and other airborne particles into the interior of the switch; and The provision of such a starting switch which is of compact size and rugged construction, which is reliable in operation, which is easy to install in the motor, and which has a relatively long service life.

Other objects and features of the invention will be in part apparent and in part pointed out hereinafter.

SUMMARY OF THE INVENTION

Briefly stated, this invention is intended for use with a dynamoelectric machine, and more particularly with an electric motor such as a fractional horsepower induction motor comprising a stator, a rotor, and shaft journal with respect to the stator and supporting the rotor. The stator assembly includes a main winding and an auxiliary winding, and as is typical, the motor further includes a starting switch operable to deenergize the auxiliary winding upon the motor obtaining a predetermined speed during start up. A centrifugal actuator is mounted on the rotor shaft and is operably connected to the starting switch for actuating the latter in response to the motor attaining its predetermined speed during start up. The centrifugal actuator has a portion thereof shiftable axially on the shaft of the motor between a starting position and a run position upon start up of the motor and upon the motor obtaining its predetermined speed, the actuator being further shiftable in opposite axial direction from its run to its starting position upon slowing down or stopping of the motor thereby to reset the starting switch in its starting position. The starting switch has a housing adapted to be secured in fixed position with respect to the centrifugal actuator and has at least one switch contact movable therewithin in response to the movement of the centrifugal actuator between its start position in which the auxiliary winding of the motor is energized and a running position in which the auxiliary winding is deenergized. Specifically, the improvement of this invention relates to an actuator lever rotatably mounted on the housing which is cooperable with the movable switch contact and with the axially shiftable portion of the centrifugal actuator for effecting movement of the switch contact between its starting and run positions in response to movement of the centrifugal actuator portion between its staring and run positions. The centrifugal actuator shiftable portion has an inclined cam surface which is engageable with the actuator lever as the centrifugal actuator portion moves from its run to its starting position for effecting movement of the movable contact from its run to its starting position during only a portion of the stroke of the centrifugal actuator member as the latter moves from its run to its start position. The centrifugal actuator portion has another surface contiguous to the inclined cam surface with this other surface being generally parallel to the longitudinal axis of the shaft and being engageable with the rotary actuator lever after the latter has effected movement of the movable switch contact to its starting position thereby to hold the movable switch contact in its starting position substantially without the application of additional force to the movable contact as the centrifugal actuator completes its stroke to its full start position. With the switch housing mounted in fixed position relative to the centrifugal actuator, the rotary actuating lever is pivoted to the housing so that the portion of the actuating lever engageable with the inclined and cylindrical cam surface of the centrifugal actuator moves generally radially with respect to the longitudinal axis.

BRIEF DESCRIPTION OF THE DRAWINGS

FIG. 1 is a side elevational view of a motor starting switch of the present invention as it is rigidly mounted on the endshields of a motor or other dynamoelectric machine and further illustrating a portion of the rotor shaft of the dynamoelectric machine on which is mounted a centrifugal actuator operable to effect actuation of the starting switch between its starting and run positions;

FIG. 2 is a vertical longitudinal cross-sectional view of the motor starting switch and a portion of the centrifugal actuator movable between a starting position (as shown in solid lines) and a run position (as shown in dotted lines);

FIG. 3 is a somewhat enlarged front elevational view of the motor starting switch of the first embodiment with its cover removed in its starting position;

Corresponding reference characters indicate corresponding parts throughout the several views of the drawings.

DESCRIPTION OF PREFERRED EMBODIMENTS

Figure 6:
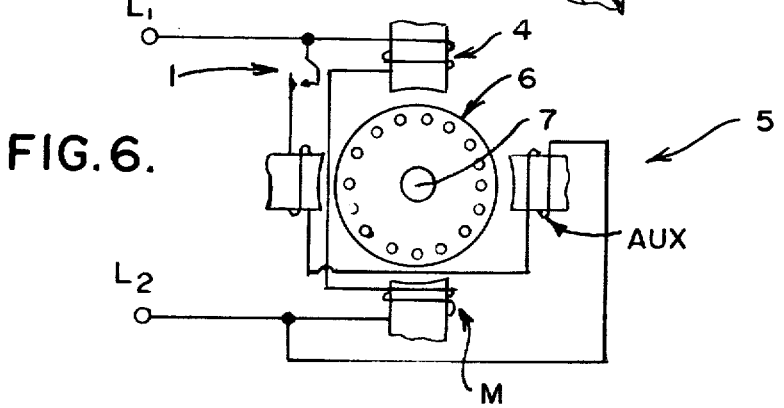
FIG. 6 is a semi-diagrammatic view of a typical dynamoelectric machine (e.g., a split phase induction motor) illustrating the arrangement of the main winding and auxiliary windings of the stator assembly of the motor and the connection of the motor starting switch of the present invention to the auxiliary windings of the motor.

Referring now to the drawings, a first embodiment of a motor starting switch of the present invention is indicated in its entirety by reference character 1 in FIGS. 1-3. The motor starting switch is shown to be mounted on an endshield 3 of the stator assembly 4 (see FIG. 6) of a conventional dynamoelectric machine 5, such as a split phase fractional horsepower induction motor. The motor further includes a squirrel cage rotor 6 mounted for rotation within the motor of the stator assembly. The rotor includes a rotor shaft 7 on which the rotor is mounted. The rotor shaft is journaled for rotation in suitable bearings provide in endshields 3 of the stator assembly. The stator assembly, as is conventional, comprises a main winding M and an auxiliary winding AUX. The general arrangement of stator assembly 4 and rotor 6 is generally depicted to FIG. 6 and is, of course, well known to those skilled in the art. For the sake of brevity, a complete description of the stator and rotor assemblies have been omitted from this disclosure.

As shown in FIG. 1 and is generally indicated at 9, a centrifugal actuator is mounted on rotor shaft 7 for rotation therewith. For example, the centrifugal actuator may be similar in construction and operation to the centrifugal actuator disclosed in the coassigned U.S. Pat. No. 3,609,421 to Eugene F. Hildebrandt, one of the inventors of the present invention, except for differences as will be hereinafter pointed out. Generally, centrifugal actuator 9 includes a sleeve 11 received on shaft 7 and an actuator collar 13 slidably movable in a longitudinal direction on sleeve 11 between a start (or off) position (as shown in solid lines in FIG. 1) and run position (as shown in dotted lines in FIG. 2) in response to pivoting movement of centrifugal levers 15a, 15b. These levers are spring biased toward their off position (as shown in solid lines in FIG. 1) by means of tension springs 17 and the levers are subjected to centrifugal force upon shaft 7 beginning to rotate. Upon the shaft (and hence the motor) obtaining a predetermined rotational speed upon start up of the motor (for example, about 80% of the synchronous speed of the motor), the centrifugal force acting on levers 15a, 15b is sufficient to overcome the bias of spring 17 and thus the levers pivot about respective pivot points 18 (see FIG. 1) on the centrifugal actuator so as to effect axial movement of the actuator collar 13 in one direction along the longitudinal axis of shaft 7 (i.e., as shown in FIG. 1) thereby to effect actuation of switch 1 from its start to its run position. It will be understood that with the motor stopped and with the starting switch 1 in its starting position, switch contacts within the switch 1 (as will be hereinafter described in detail) ar in position for energization of both the main winding M and auxiliary winding AUX. With both the main and auxiliary windings energized during start up, the motor will generate sufficient torque for starting purposes. As the motor accelerates to its synchronous operating speed, the field generated by the main windings is sufficient to maintain operation of the motor and thus the auxiliary windings are no longer needed. Thus, as switch 1 is switched from its start to its run position, the auxiliary winding is disconnected from the source of the power by means of the starting switch. Upon the motor slowing below a predetermined speed or upon stopping, spring 17 shift levers 15a, 15b and actuator collar 13 from their respective run positions to their off or starting position and again effect the resetting of switch 1 to its starting position.

It will be understood that the disclosure of the above-noted coassigned U.S. Pat. No. 3,609,421, as it applies to centrifugal actuator 9 above described, is incorporated herein by reference and should be referred to for a more complete disclosure of the construction and operation of centrifugal actuator 9.

Specifically, however, centrifugal actuator 9 differs from the centrifugal actuator disclosed in the above-noted prior patent in that actuator collar 13 is herein shown to have a generally conical cam surface 19 facing toward motor starting switch 1 (i.e., facing away from the direction of movement of collar 13 as it moves from its starting to its run position), and an outer cylindrical holding surface 20 generally coaxial with the longitudinal center line of shaft 7 and contiguous with conical cam surface 19. It will be understood that conical cam surface 19 and cylindrical holding surface 20 are surfaces of revolution about the longitudinal centerline of shaft 7.

Starting switch 1 is shown to comprise a housing or mounting frame 21 molded, for example, of a suitable synthetic electrical insulating resin. The housing is shown to have side walls 23, a bottom wall 25, a back wall 26 and a top wall 27. A removable front cover 29 (see FIG. 2) covers the interior of the housing and various switch contact parts as will be hereinafter specified. A plurality of terminals is indicated at $T_1$-$T_5$ is fixedly secure in top wall 7. As is conventional, terminals T are made of suitable sheet metal, are electrically conductive, and are substantially rigid to top wall 27. Certain of the terminals carry stationary or fixed contacts, as indicated at 31, 33, and 35, and others of the terminals support flexible switch arms 37 and 39. These switch arms respectively carry movable electrical contacts 38 and 40 of their free ends which in turn cooperate with respective fixed contacts to constitute a single pole double throw switch (SPDT) as generally indicated at $S_1$, and a single pole single throw (SPST) switch $S_2$. Flexible switch arms 37 and 39 are preferably made of a resilient, electrically conductive sheet metal alloy, such as beryllium copper or the like, and the switch arms are cantilevered from their respective terminals $T_4$ and $T_5$. Switch arm 37 is formed so that it is normally spring biased into engagement with its respective fixed contact 33 and switch arm 39 is so formed that it is spring biased into engagement with its respective fixed contact 35 when centrifugal actuator 9 and hence the starting switch is in its starting position. Thus, when switch 1 of the present invention is in its run position, switch arms 37 and 39 assume a position opposite from that shown in FIG. 1 so that switch $S_1$ completes a circuit from terminal $T_2$ to $T_4$ and so that switch $S_2$ completes a circuit between terminals $T_1$ and $T_5$.

In accordance with this invention, a rotary actuator member, as generally indicated at 41, is pivotally mounted with respect to the housing 21 and is engageable by actuator collar member 13 as the latter shifted between its run and starting positions for flexing switch arms 37 and 39 and for making and breaking switches S1 and S2. Preferably, rotary actuator 41 is rigid, unitary one piece member molded of suitable synthetic resin electrical insulation material. The rotary actuator member 41 is shown to have a hub 43 with an opening 45 therethrough. A post 47 integral with back wall 26 of housing 21 extends outwardly from the back wall and is disposed generally in the plane of bottom wall 25. An opening 49 is provided in bottom wall 25 for reception of hub 43 of the actuator member and, as is generally indicated at G, a relatively small gap (e.g., about 0.01 inches or about 0.25 mm.) is provided between the edges of the bottom wall defining opening 49 and the outer surface of hub 43. A retainer 48 (e.g., a snap ring) is installable on the outer end of the post 47 for securely holding rotary actuator member 41 on post 47 and for permitting rotary actuator member to freely rotate or pivot on the post or may be retained by switch cover 29.

A lever 51 extends from the bottom of hub 43 and is disposed outside of housing 21. Lever 51 has a cam follower, as generally indicated at 53, and its outer or free end is cammingly engageable with conical cam surface 19 and within cylindrical holding surface 20 on actuator collar 13. A switch lever 55 extends from the upper side of hub 43 within housing 21 and engages both switch arms 37 and 29 so as to effect movement of the switch arms from their normal positions as when the switch is in its run position to their flex positions (as illustrated in FIG. 3) when the centrifugal actuator and the switch are in their respective start positions.

Switch lever 55 has a stub 57 which extends outwardly therefrom and slidingly engages the bottom face of switch arm 39 so as to open and close switch S2.

Furthermore, a coil compression spring 59 is interposed between switch lever 55 and the bottom face of switch arm 37 so as to flex switch arm 39 from engagement with fixed contact 33 to engagement with contact 31 upon movement of centrifugal actuator 9 from its run to its start position.

In accordance with this invention, it will be observed in FIG. 3 that rotary actuator member 41 is pivotally mounted on post 47 at some lateral distance from one side of the longitudinal centerline of shaft 7 and that cam follower 53 is on the opposite side of the longitudinal centerline of shaft 7. Thus, the outer end of cam follower 53 is moved generally radially with respect to the longitudinal centerline of shaft 7 as actuator member moves axially between its start and run positions.

As shown in FIG. 1, cam follower 53 has an inclined cam face 61 and a bottom face 63. With centrifugal actuator 9 in its run position and with the actuator collar 13 shifted to its position shown in dotted lines in FIG. 2, switch arms 37 and 39 resiliently bias rotary actuator member 41 to rotate on post 47 in generally counterclockwise direction (as viewed in FIG. 3) and thus cam follower 52 is positioned at or below the level of inclined cam face 19 on actuator collar 13. Upon slowing or stopping of the motor and upon movement of actuator collar 13 from its run to its starting position, inclined cam face 61 of cam follower 53 is engaged by the inclined or conical cam face 19 of actuator collar 13. Continued movement of actuator collar 13 toward its start position causes cam follower member 53 to ride up cam surface 19. Upon the bottom of edge of inclined cam face 61 reaching the transition of actuator collar 13 between conical surface 19 and cylindrical holding surface 20, the bottom surface 63 of cam follower 53 engages holding surface 20 thereby holding switches 37 and 39 in their start positions (as shown in FIG. 3) as actuator collar 13 continues its movement toward its start position without causing further movement of rotary actuator member 41. In this manner, switch arms 37 and 39 are positively and quickly moved from their run positions to their start positions during only a portion of the stroke or travel of the actuator collar 13 as the latter moves from its run to its start position. It will be further noted that, due to the inclination of cam surfaces 19 and 61, only a portion of the stroke of actuator collar 13 is required to actuate switch 1 from its run to its start position as the actuator collar moves from its run to its start position. Thus, so long as cam follower 53 engages actuator collar 13 at some point along its stroke with sufficient travel of the actuator collar remaining so as to effect movement of rotary actuator member 41, the switch will be actuated from its run to its start position. Thus, in accordance with this invention, the sensitivity of starting switch 1 with respect to its axial relation relative to centrifugal actuator 9 is remarkably reduced over comparable prior art starting switch arrangements. Accordingly, the requirement of having to accurately shim switch 1 with respect to actuator 9 so as to reduce endplay (or so as to adjust actuation of the switch during movement of the centrifugal actuator) is significantly reduced.

Further in accordance with this invention, switch 1 is not as subject to draw significant amounts of airborne lint or dust into the interior of switch housing 21, even when the switch is operated in a high dust or lint environment, such as would be present inside the motor of a clothes dryer or the like. More significantly, terminals T of the switch 1 are substantially sealed with respect to housing 21 (i.e., the terminals are in close fitting relation with the housing if not hermetically sealed therewith) so as to substantially block the entrance of dirt laden air into the housing via the terminal openings. Further, cover 29 fits tightly on housing 21 so as to enclose the switch contacts therewithin. Heretofor, prior art starting switches oftentimes had an axially movable plunger, and the plunger would move in and out of the housing in a pumping motion when repeatedly actuated by the amount of movement of the plunger being generally equal to the amount of movement of the switch arms so that any dust clinging to the plunger would be forced inside the housing. However, in sharp contrast, the rotary actuator member 41 of the starting switch of the present invention moves only slightly relative to bottom wall 25 of the housing at the point through which the actuator member passes through the housing. As can be seen in FIG. 3, rotary actuator 41 moves through only a slight degree of rotary movement (e.g., about 5 degrees) to effect movement of the switch contacts from their run to their starting positions. Thus, the relative movement of hub 43 of rotary actuator member 41 with respect to the edges of bottom wall 25 defining opening 49 therein is only a few thousandths of an inch and thus the tendency of "pumping" of lint or dust clinging to rotary actuator member 41 into the interior of the switch is markedly reduced. Further, a relatively close gap G (e.g., about 0.010 inches or 0.25 mm) is maintained between the edges of bottom wall 25 defining opening 49 in bottom wall 25 so as to substantially prevent the entrance of airborne dust particles into the switch.

Figure 5:
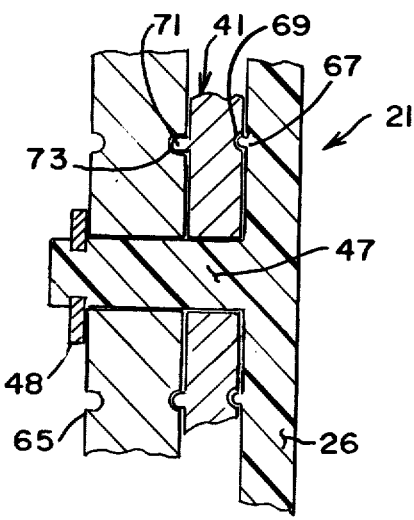
FIG. 5 is an enlarged cross-sectional view taken along line 5—5 of FIG. 3 illustrating a labryinth seal arrangement for inhibiting the entrance of airborne lint or dust particles into the interior of the starting switch.

As shown in FIG. 5, rotary actuator 41 may be optionally provided with a seal 65 for even more positively preventing dust and lint from enetering housing 21. Specifically, back wall 26 of housing 21 is shown to be provided with a circular rib 67 concentric with the axis of post 47. Actuator member 41 is shown to be provided with a groove 69 which receives rib 67. Further, the outer face of actuator member 41 proximate opening 45 receiving post 47 is provided with an outwardly projecting rib 71. Seal member 65 is disposed on the exterior of the actuator and it has a groove 73 which receives rib 71. Thus, the interfitting ribs and grooves form a labyrinth seal arrangement which readily permits rotory movement of actuator member 41 so as to operate the switch parts without appreciably increasing the force required to operate the switch, and yet effectively seals out dust and lint from the interior of the switch. Of course, snap ring 48 may be used to hold seal 65 and rotory actuator 41 in place on post 47.

Figure 4:
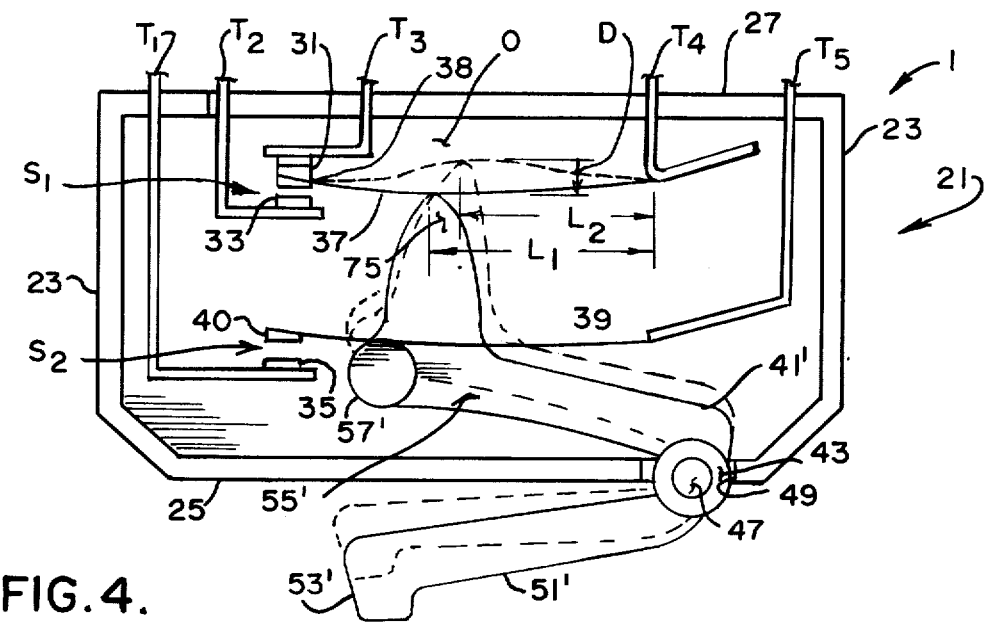
FIG. 4 is a view similar to FIG. 3 illustrating a second embodiment of the starting switch of the present invention.

Referring now to FIG. 4, switch 1 is shown to have a modified rotary actuator member, as generally indicated in 41'. Generally, modified actuator member 41' operates in the manner similar to actuator member 41 heretofor described. The primed reference characters, as shown in FIG. 4, indicate portions of actuator member 41' having a similar construction and operation to actuator member 41 heretofor described. However, one significant difference between actuator member 41' and the actuator member heretofor described is the omission of the coil compression spring 59 for transferring force from centrifugal actuator 9 to the upper flexible switch arm 37. Specifically, rotary actuator member 41' is provided with an integral finger 75 which slidingly engages the bottom face of switch arm 37 and which pushes the switch arm upwardly as the rotary actuator member rotates from its run to its starting position upon axial shifting movement of the centrifugal actuator. Since rotary actuator member 41' is a rigid integral unit pivoted for rotation about the axis of post 47, finger 75 also rotates about post 47 and thus the point at which it engages the bottom face of switch arm 37 varies along the length of the switch arm as the centrifugal actuator moves the rotary actuator member from its starting to its stop position. Still further, in switch applications in which the switch actuator member is subject to further movement towards its starting position upon the engagement of movable contact 38 with its respective fixed contact 31, the provision of a rotary actuator member, such as rotary actuator member 41' with finger 75 thereon, functions to at least in part limit the application of force to the switch arm which in turn aids in reducing the stress applied to the switch arm. As heretofore noted, switch arm 37 is cantilevered from its mounting terminal T4. As the switch arm is moved from its run to its starting position and as its movable contact 38 engages fixed contact 31, the support of the switch arm changes from a cantilevered beam fixed at one end and freely supported at the other end to a beam which is fixed at one end and simply supported at the other end. As the centifugal actuator continues to move toward its off position after movable contact has engaged its fixed contact 31, additional deflection of the switch arm will be effected as is generally indicated at D in FIG. 4. It will be appreciated that the deflection D is related to the additional movement of the rotary actuator member 41' as the centrifugal actuator moves into its start position. In certain instances, when the centrifugal actuator engages the cam follower member 53' of rotary actuator member 41' immediately upon its beginning to move from its run position, it will be appreciated that a considerable amount of additional movement of the rotary actuator member may be effected after the switch contacts have been moved from their run to their start positions. It is especially true that an appreciable degree of the deflection of the switch arm 37 may be present if a centrifugal actuator not having clyindrical holding surface 20 is used. In accordance with this invention, as rotary actuator member 41 continues to rotate on post 47, the point of contact along the length of switch arm 37 varies from the position $L_1$ shown in FIG. 4 when movable contact 38 first engages its fixed contact 31 to a point $L_2$ when the centrifugal actuator is finally in its start position. The change in length ($\Delta L$) of the point of contact on the switch arm serves to decrease the bending stresses to which the switch arm is subjected even though the amount of deflection D remains essentially the same. Because of the change of length, it is possible, in many instances, to avoid permanent deformation of switch arm 37 so that the switch arm will readily return to its desired condition upon start of the motor and the switch arm will retain sufficient spring action to make good electrical contact between movable contact 38 and fixed contact 33 when the switch is in its run position.

It will be appreciated that in regard to rotary actuator member 41 illustrated in FIG. 3, the purpose of compression coil spring 59 interposed between lever 55 and the bottom face of switch arm 37 is to limit the loads of forces interposed on the switch arm by the actuator member so as to prevent overstressing and permanent deformation of the switch arm. It will be further appreciated that upon the free end of switch arm 37 engaging fixed contact 31, the compression coil spring 59 (FIGS. 1-3) will compress upon further clockwise rotation of actuator member 41 (as viewed in FIG. 3) thereby limiting the amount of deflection impose on switch arm 37 and thus limiting in effect the amount of bending stresses applied to the switch arm.

Figure 7:
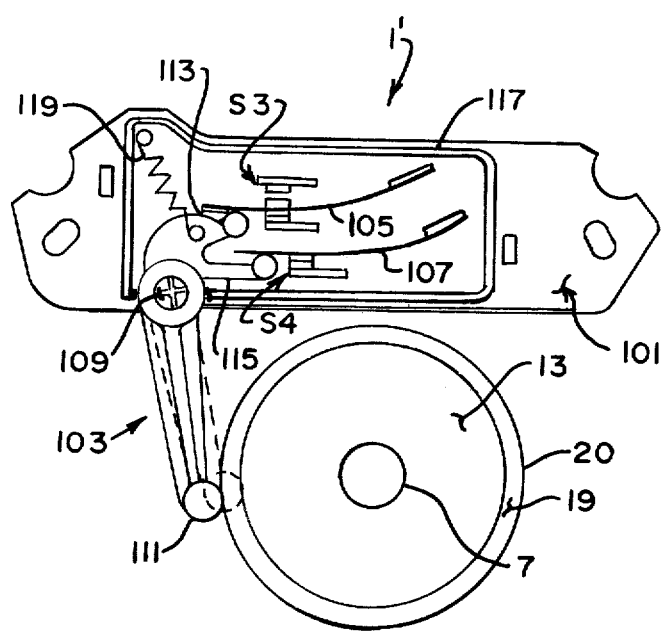
FIG. 7 is a front elevational view of another embodiment of the switch of this invention.

Referring now to FIG. 7, still another embodiment of the starting switch of the present invention is shown, this other embodiment being indicated in its entirety at 1'. As shown, switch 1' comprises a mounting frame 101 on which a switch actuator arm 103 is pivotally mounted. Thus, mounting frame 101 is generally analogous to housing 3 and actuator arm 103 is generally analogous to rotary actuator member 41 heretofore described. Frame 101 is shown to have a pair of movable switch arms 105 and 107 cantilever-mounted thereon for opening and closing a pair of switches S3 and S4. it will be appreciated that switch arms 105 and 107 are generally similar to switch arms 37 and 39 and that switches S3 and S4 correspond to switches S1 and S2 heretofore discusssed. Switch arm 103 is pivotally mounted on frame 101 on a post 109 and, as shown in FIG. 7, it is offset mounted with respect to shaft 7 such that its cam follower end 111 moves generally radially relative to the centerline of shaft 7. Further, arm 103 includes a pair of fingers 113 and 115 engageable with respective switch arms 105 and 107 for moving or flexing the switch arms to make or break switches S3 and S4 upon switch 101 being actuated between its start and run positions by movement of actuator member 13 as it moves between its start and run positions.

Further, switch 101 may be provided with an optional cover 117 which snaps in place on frame 103 to enclose and protect switches S3 and S4 and their respective switch contacts from contamination by dirt, dust, or other airborne particles. The front of the cover overlying the switches has been omitted for purposes of illustration. A spring 119 may be included in switch 101 to resiliently bias the actuator lever 103 toward switch arms 105 and 107.

As heretofore described in regard to switch 1, cover 117 fits closely around the hub of actuator arm 103 with a tight gap therebetween so as to inhibit the introduction of airborne dust into the interior of the switch during operation thereof. In this manner it will be seen that frame 101 and cover 117 cooperate with the mounting hub of the actuator arm in a manner similar to bottom wall 25 of housing 21.

In view of the above, it will be seen that the several objects of this invention are achieved and other advantageous results obtained.

As various changes could be made in the above construction without departing from the scope of the invention, it is intended that all matter contained in the above description and shown in the accompanying drawings shall be interpreted as illustrative and not in a limiting sense.

What is claimed is:

1. In a dynamoelectric machine, such as an electric motor, comprising a stator, a rotor and a shaft journalled with respect to the stator and supporting the rotor, said shaft having a longitudinal axis, said motor further including an auxiliary winding and a starting switch operable to de-energize said auxiliary winding upon the motor obtaining a predetermined speed during start up, said motor further including a centrifugal actuator mounted on said shaft and operatively connected to said starting switch for actuation of the latter in response to said rotor obtaining said predetermined speed, said centrifugal actuator having a portion thereof shiftable axially upon said shaft between a start position and a run position upon start up of the motor and upon said rotor obtaining said predetermined speed and being shiftable in reverse direction from its run to its start position upon slowing or stopping of the rotor thereby to reset said starting switch, the latter having a housing adapted to be secured in fixed position relative to said centrifugal actuator and having at least one switch contact therewithin movable in response to movement said centrifugal actuator between a start position in which said auxiliary winding is energized and a run position in which said auxiliary winding is de-energized, said housing having a wall, wherein the improvement comprises: an opening in said housing wall, said opening being offset to one side of said longitudinal axis of said shaft, a post secured to said housing and located within said opening, said post extending generally parallel to the longitudinal axis of said shaft, an actuator member journalled on said post, said actuator member having a cam follower extending from said post in generally transverse direction with respect to said longitudinal axis of said shaft and being cammingly engageable with said centrifugal actuator portion on the other side of said longitudinal axis from said post as said centrifugal actuator portion shifts axially between its run and start positions, said actuator member further having a movable contact lever disposed within said housing and cooperable with said movable switch contact, said actuator member being rotatable on said post in a generally radial direction with respect to said centrifugal actuator portion as the latter shifts axially between its start and run positions thereby to effect operation of said movable switch contact between its start and run positions.

2. In a dynamoelectric machine as set forth in claim 1 wherein said actuator member has a hub, the latter having a hub aperture therein, said hub aperture receiving said post thereby to rotatably mount said actuator member on said post, said hub having a relatively close fit with said housing wall adjacent said opening whereby the movement of said hub relative to said housing wall and the close fit between housing wall and said hub inhibits the introduction of particulate contaminants into said housing via said opening.

3. In a dynamoelectric machine as set forth in claim 1 wherein said centrifugal actuator portion is movable through an axial distance relative to said shaft greater than the movement of said centrifugal actuator portion required to actuate said movable switch via said actuator member, wherein said movable switch contact includes a centilevered switch arm, and wherein said actuator member includes a spring interposed between said movable contact lever and said movable switch contact for limiting the force applied to said movable contact arm.

4. In a dynamoelectric machine as set forth in claim 1 wherein said centrifugal actuator portion is movable through an axial distance relative to said shaft greater than the movement of said centrifugal actuator portion required to actuate said movable switch via said actuator member, wherein said movable switch contact includes a cantilevered switch arm, and wherein said actuator member includes a finger movable with said movable contact lever slidably engageable with said cantilever switch arm and varying the point of contact therealong as said centrifugal actuator moves through its full distance thereby to decrease stresses on said cantilever switch arm.

* * * * *